United States Patent
Turski et al.

(10) Patent No.: US 8,862,737 B2
(45) Date of Patent: Oct. 14, 2014

(54) APPLICATION INTEGRATION OF NETWORK DATA BASED ON RESOURCE IDENTIFIERS

(75) Inventors: Andrzej Turski, Redmond, WA (US); Matthew MacLaurin, Woodinville, WA (US); Cezary Marcjan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 12/822,823

(22) Filed: Jun. 24, 2010

(65) Prior Publication Data
US 2011/0320603 A1 Dec. 29, 2011

(51) Int. Cl.
*G06F 15/173* (2006.01)
(52) U.S. Cl.
USPC ............ 709/226; 709/225; 709/229; 709/230
(58) Field of Classification Search
USPC .................................. 709/226, 225, 229, 230
See application file for complete search history.

(56) References Cited

U.S. PATENT DOCUMENTS

| | | | |
|---|---|---|---|
| 7,290,262 B2 | 10/2007 | Blizniak et al. | |
| 7,617,458 B1 | 11/2009 | Wassom, Jr. et al. | |
| 2006/0075069 A1* | 4/2006 | Mohan et al. | 709/218 |
| 2007/0124445 A1* | 5/2007 | Harris et al. | 709/223 |
| 2007/0157113 A1 | 7/2007 | Bishop et al. | |
| 2007/0288858 A1* | 12/2007 | Pereira et al. | 715/764 |
| 2008/0155110 A1* | 6/2008 | Morris | 709/230 |
| 2008/0313714 A1 | 12/2008 | Fetterman et al. | |
| 2009/0144447 A1* | 6/2009 | Wittig et al. | 709/245 |
| 2010/0049842 A1* | 2/2010 | Koski | 709/223 |
| 2010/0058353 A1 | 3/2010 | Turski | |
| 2011/0145299 A1* | 6/2011 | Zhou | 707/802 |

FOREIGN PATENT DOCUMENTS

| | | |
|---|---|---|
| WO | 0190912 A1 | 11/2001 |
| WO | 2009094635 A1 | 7/2009 |

OTHER PUBLICATIONS

Brooks, David. "Custom Hyperlinks Using Asynchronous Pluggable Protocols." Sep. 19, 2006. Code Project ASP.NET Web Development, retrieved from http://www.codeproject.com/Articles/15634/Custom-Hyperlinks-Using-Asynchronous-Pluggable-Pro.*
"Bkbrowser 1.1.3", Retrieved at << http://mac.wareseeker.com/Network-Communication/bkbrowser-1.1.3.zip/c40ef8bf2 >>, Dec. 26, 2009, pp. 2.

(Continued)

*Primary Examiner* — Nicholas Taylor
(74) *Attorney, Agent, or Firm* — Dan Choi; Judy Yee; Micky Minhas

(57) ABSTRACT

A resource identifier parser can derive information from resource identifiers that are provided to non-browser application programs or the operating system, such as through the desktop area of a windows-based user interface. The resource identifier parser can understand the formatting of resource identifiers of specific domains and can derive therefrom information such as coordinates of a map page, the title of classified listings, and other like information. If the resource identifier cannot be parsed, the identified data page can be referenced to identify services offered by the page, such as data feed services, which can then be presented to the non-browser application program or the operating system to which the resource identifier was provided. As yet another alternative, the domain can provide a customized resource identifier parser to parse its resource identifiers. Such a customized parser can be either downloadable and locally executable or it can be a network service.

15 Claims, 3 Drawing Sheets

(56) References Cited

OTHER PUBLICATIONS

"Best Facebook Desktop Applications for Windows", Retrieved at << http://www.sizzledcore.com/2009/09/10/best-facebook-desktop-applications-for-windows/ >>, Retrieved Date: Mar. 31, 2010, pp. 12.

Scott., "Windows Live Writer Gadget", Retrieved at << http://gallery.live.com/liveItemDetail.aspx?li=b913ce6d-2f6a-4d08-869b-65d9850320e4 >>, Version: 0.7.0.0 (BETA), Feb. 8, 2007, p. 1.

Hagge, Damian., "Dynamic Discovery and Invocation of Web Services", Retrieved at << http://www.ibm.com/developerworks/webservices/library/ws-udax.html >>, Aug. 1, 2001, pp. 11.

International Search Report, Mailed Date: Feb. 17, 2012, Application No. PCT/US2011/041373, Filed Date: Jun. 22, 2011, pp. 8. (MS# 329627.02).

Milne, et al., "Project "REED" Building Performance Simulation for the Masses", Retrieved at <<www.ibpsa.org/proceedings/BS1999/BS99_A-16.pdf>>, Building Simulation, 6, 1999, Kyoto, Japan, pp. 137-144.

\* cited by examiner

APPLICATION INTEGRATION OF NETWORK DATA BASED ON RESOURCE IDENTIFIERS

BACKGROUND

For modern computing devices, including traditional personal computers, as well as personal digital assistants, cellular telephones, and the like, network communicational abilities have become ubiquitous. Such ubiquity in network communicational abilities enables modern computing devices to spend an ever increasing amount of time being communicationally coupled to one or more networks of computing devices. Traditionally, resources provided by the computing devices that are communicationally coupled to such networks are identified and accessed by other computing devices with reference to resource identifiers. Resource identifiers are typically comprised of alphanumeric characters that uniquely identify one or more resources accessible via a network. Resource identifiers can often, not only identify a particular resource, but can also comprise programmatic information that can be provided to one or more processes executing on a remote computing device, that is being accessed over a network, to enable that remote computing device to obtain, filter, create or otherwise manipulate one or more resources prior to their transmission across the network.

Traditionally, network resources are accessed over a network via one or more network browser application programs executing on a client computing device that is accessing the resources. Such network browser applications can copy network resources to the computing device on which they are executing, display information presented by such network resources on display devices coupled to the computing devices on which such browsers are executing, provide interactivity with network resources, and other like functionality. For example, web browser application programs that are capable of browsing the ubiquitous World Wide Web (WWW) can display information in accordance with the structure and formatting defined by a web page, can download files and other objects, and can execute computer-executable instructions within the framework of the web browser. Other, non-browser, applications have the capability to act upon resources received from other computing devices over a network, but such other non-browser application programs are typically designed to only accept specific types of data and resources and may not comprise the flexibility of modern network browser application programs. Thus, on a modern computing device, a user may spend a substantial amount of time interacting only with network browser application programs to access resources available from other computing devices over a network.

SUMMARY

In one embodiment, resource identifiers can be parsed to obtain parsed information therefrom that can be provided to non-browser application programs to enable the functionality of those application programs to be extended with information associated with network-based resources without requiring a browser application program to obtain such resources.

In another embodiment, resources and content identified by a resource identifier can be obtained and examined for information that can be utilized by a non-browser application program and such information can be provide to the non-browser application program.

In a further embodiment, a remote computing device can provide a customized resource identifier parser to provide for the parsing of resource identifiers whose structure may not be known in advance. Information derived from the parsing performed by such a customized parser can be provided to non-browser application programs. The customized parser can be a downloadable component, or it can be resource that can be accessed over a network In a still further embodiment, one or more resource identifiers can be provided to a non-browser application program and, upon such a provision, they can be parsed or the resources identified by them can be examined to provide such non-browser application programs with utilizable information beyond the mere characters of the resource identifier. If such attempts fail to identify information utilizable by the non-browser application program to which such resource identifiers were provided, the resource identifiers can be treated in a traditional manner.

In a yet further embodiment, one or more resource identifiers can be provided to a desktop user interface and, upon such a provision, they can be parsed or the resources identified by them can be examined to identify utilizable information beyond the mere characters of the resource identifier. A default application program can then be invoked to handle such indentified utilizable information within the desktop user interface context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
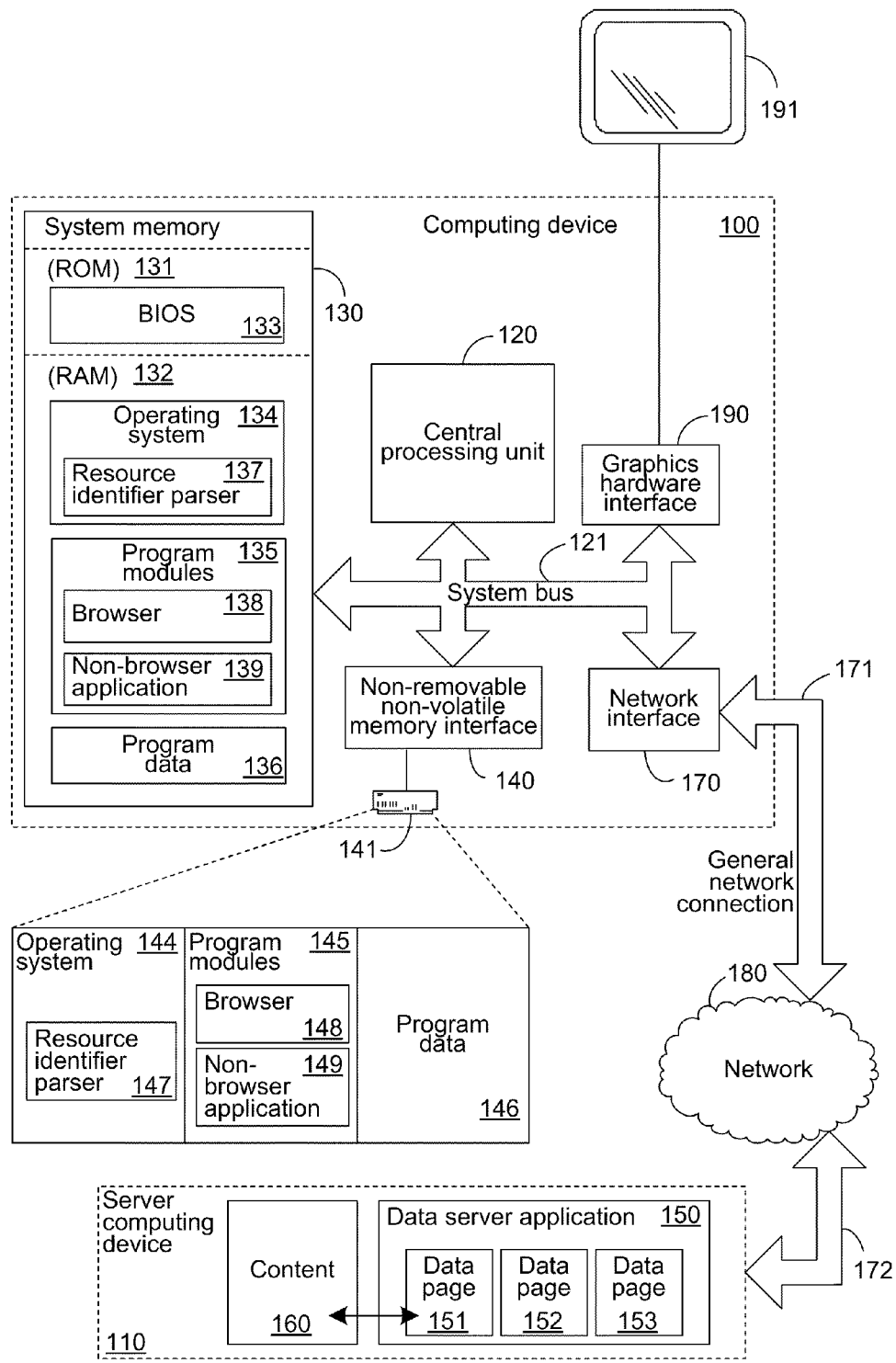
FIG. 1 is a block diagram of an exemplary computing device with a resource identifier parser.

The following description relates to a resource identifier parser that can obtain information, utilizable by non-browser applications programs, either from the alphanumeric characters that comprise a resource identifier, from the information contained on, or associated with, a network resource identified by the resource identifier, or via the utilization of customized parsing capability that can be provided by a service associated with the resources that are identified by the resource identifier. When a resource identifier is provided to non-browser application programs, rather than having the resource identifier merely be treated as text, or a pointer to a resource, the resource identifier parser can be utilized to provide, to the non-browser application program, the utilizable information obtained by the resource identifier parser. If no utilizable information can be obtained, the resource identifier can be treated in a traditional manner. Similarly, if a resource identifier is provided to a desktop user interface, such as is typically generated by an operating system, the resource identifier parser can obtain utilizable information, and a default application program, or other executable component, can be instantiated to handle such information, or additional network-based content associated therewith.

While the below descriptions are directed to the implementation of the resource identifier parser within the context of specific, ubiquitous, resource identifiers, such as Uniform Resource Locators (URLs), and ubiquitous networks, such as the Internet, they are not so limited. In particular, the mechanisms described are both resource identifier and network agnostic and can operate in a manner identical to that described below on any resource identifier and on any network framework or topology. As such, references to URLs, web pages, the Internet, and the like, are meant to be exemplary only and do not indicate any specific limitation of the mechanisms described.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures, where data is maintained, are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is shown. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The exemplary computing device 100 can optionally include graphics hardware, including, but not limited to, a graphics hardware interface 190 and a display device 191. Such graphics hardware, including the graphics hardware interface 190 and a display device 191, can be utilized to, not only display the below-described user interface, but also, in some embodiments, to perform some or all of the relevant computation and processing described below.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

A resource identifier parser 137, whose operation will be described in detail below, can be a component of the operating system 134 or, alternatively, it can be a separate collection of computer-executable instructions that can be considered as part of the program modules 135. As yet another alternative, components of the operating system 134 and the program modules 135 can operate in concert to perform the functionality attributed below to the resource identifier parser 137. In addition, the program modules 135 can comprise one or more application programs, such as the network browser application program 138, which can be comprised of computer-executable instructions that can be executed by the central processing unit 120 in accordance with mechanisms well known to those skilled in the art. The program modules 135 can also comprise one or more non-browser application programs, such as the non-browser application program 139. Such non-browser application programs can be any application program whose primary function is other than the retrieval and presentation of information obtained from remote networked servers, including, for example, content-creation application programs, such as word processors and spreadsheets, as well as photo-editing application programs, visualization or rendering application programs, and even more limited functionality application programs such as customized weather applications, financial applications and the like.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies. As such, the resource identifier parser 147 of the operating system 144, and the browser application 148 and the non-browser application 149 of the program modules 145, are likewise given different numbers to illustrate that, at a minimum, they are different copies of the resource identifier parser 137, browser application 138 and non-browser application 139, respectively.

Additionally, the computing device 100 can operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The network 180 can have communicationally coupled to it a server computing device 110 that, although not specifically shown in FIG. 1, can comprise equivalent hardware as that described above with reference to the exemplary computing device 100, including, for example, a central processing unit, a system bus, system memory, non-volatile storage, and a network interface that can be equivalent to, respectively, the central processing unit 120, the system bus 121, the system memory 130, the hard disk drive 141, and the network interface 170 that were described in detail above. The network interface of the server computing device 110 can maintain a communicational connection 172 to the network 180 that can be analogous to the general network connection 171, maintained by the computing device 100.

In addition, unlike the exemplary computing device 100, the server computing device 110 can comprise content 160 that can comprise data, information, or resources that the server computing device 110 can provide to other computing devices, such as the exemplary computing device 100, over the network 180. For example, the content 160 can comprise information that can be presented in a textual form, photographs, audio recordings, video content, downloadable computer-executable instructions, downloadable computer readable-data, locally-executable computer-executable instructions and other like content.

The server computing device 110 can further comprise a data server application 150 whose computer-executable instructions can be stored on a non-volatile storage of the server computing device and can be executed, in the system memory of the server computing device, by its central processing unit, in the same manner as the computer-executable instructions stored on the hard disk drive 141, and executed in the system memory 130, of the exemplary computing device 100, described in detail above. The data server application 150 can comprise one or more formatted pages of data, such as the data pages 151, 152 and 153 that can present data, such as obtained from the content 160, to an appropriate network browser application program, such as the browser application program 138 executing on the exemplary computing device 100, which can be communicationally coupled to the data server application 150, and can retrieve any one of the data pages 151, 152 at 153, via the network connections 171 and 172 that the exemplary computing device 100, and the server computing device 110, respectively, maintain to the network 180.

In one embodiment, the data pages 151, 152 and 153 can be web pages such as those of the World Wide Web (WWW). In such an embodiment, the data pages 151, 152 and 153 can present data utilizing the structured data presentation techniques of the well-known HyperText Markup Language (HTML). Similarly, the network 180, in such an embodiment, can be the well known Internet, while the browser application 138 can be a web browser application program, and the data server application 150 can be a web server application program. In such an embodiment, the HTML coding employed to define the data pages 151, 152 and 153 can reference, through links, the content 160 such that the data pages 151, 152 and 153 themselves merely comprise the structure and definition of a given web page, while much of the content can remain stored apart from the data pages in the content 160. As will be known by those skilled in the art, the exemplary computing device 100 and, more specifically, the web browser 138 can obtain the information of any one of the data pages 151, 152 and 153 and can present such information, such as via the display device 191, in the form of a hypermedia web page. Resource identifiers in the form of Universal Resource Locators (URLs) can be utilized by the web browser 138 to identify specific ones of the data pages 151, 152 and 153, utilizing techniques well known, and, indeed, ubiquitous, and the art.

Figure 2:
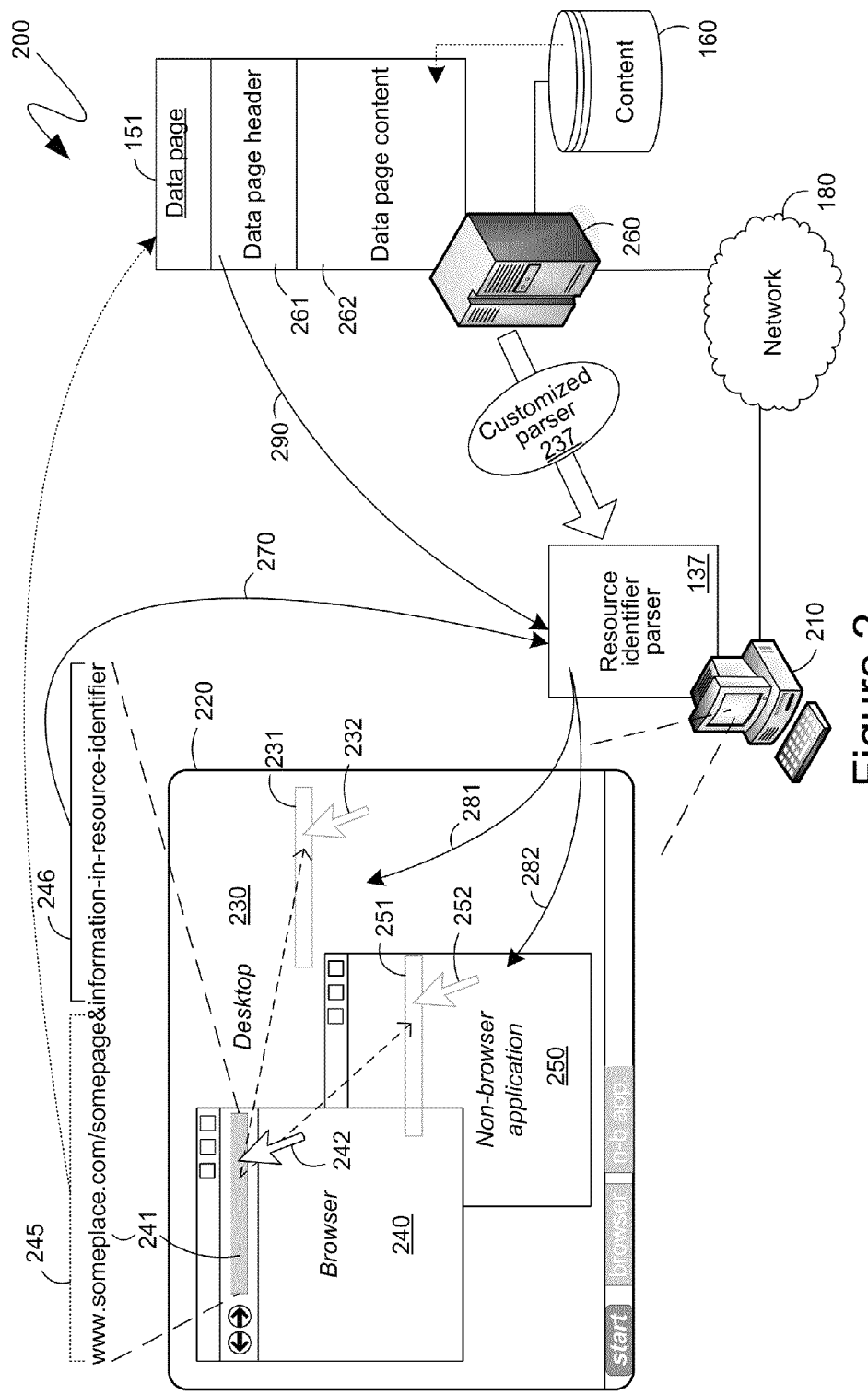
FIG. 2 is a block diagram of an exemplary operation of a resource identifier parser.

Turning to FIG. 2, the system 200 shown therein illustrates exemplary mechanisms by which the resource identifier parser 137 can parse resource identifiers and provide utilizable information to non-browser application programs that may otherwise have treated the resource identifier as nothing more than a series of alphanumeric characters. As shown in the system 200 of FIG. 2, a computing device 210 can present a user interface 220. The computing device 210 can be in the form of the exemplary computing device 100 described in detail above and shown in FIG. 1. In such a case, the user interface 220, presented by the computing device 210, can be presented through graphical hardware, such as the graphics hardware interface 190 and graphic display device 191, shown in FIG. 1 and described above.

As will be recognized by those skilled in the art, the user interface 220 illustrates a window-based user interface, such as has become ubiquitous in modern computing devices, whereby information and content is presented to the user through windows, or defined graphical regions, that are under the control of, and visually represent, a particular application program, or other set of executing computer-executable instructions. The exemplary user interface 220 illustrated in FIG. 2 comprises a browser window 240, a non-browser application window 250, and a desktop area 230. As will also be recognized by those skilled in the art, window-based user interfaces typically present their windows overlaid on a background commonly known as "the desktop" that can represent a visual and storage area that is typically controlled by the operating system providing the window-based user interface, such as the operating system 134 shown in FIG. 1. Typically, the desktop area 230 acts as a temporary storage area where users can save files that they desire short-term immediate access to. Additionally, many modern operating systems enable the desktop area 230 to comprise one or more applets, widgets, or other collections of computer-executable instructions whose functionality is somewhat limited and whose display comprises only a small portion of the desktop area 230. For example, modern operating systems can enable a weather widget to execute and present, at least visually, its information, such as the current temperature and weather, within a small defined area of the desktop area 230 that is not perceived as a window, such as would be presented by a more fully-featured application program.

In one embodiment, as illustrated in the system 200 of FIG. 2, a resource identifier, such as would typically be utilized by the browser 138, and that is typically shown in the browser window 240, can be copied from the browser to either a non-browser application 139, controlling the non-browser application window 250, or it can be copied to the operating system 134, such as would control the desktop area 230. More specifically, as shown in FIG. 2, the browser window 240 can comprise an area within which a resource identifier 241 can be specified for directing the browser 138 to retrieve the resources identified by that resource identifier 241. Additionally, the resource identifier 241 displayed within such an area is typically the resource identifier of the resources that are being presented within the main portion of the browser window 240. One mechanism by which a user can copy the resource identifier from the browser 138 to other applications or the operating system 134, would be to drag the resource identifier 241 from the browser window 240 to a window presented by a non-browser application, such as the non-browser application window 250, or to the desktop 230. Such an action is illustrated in the system 200 of FIG. 2 by showing the cursor 242 selecting the resource identifier 241 and then dragging it, either to the non-browser application window 250, as represented by the ghost resource identifier 251 and ghost cursor 252, or to the desktop 230, as represented by the ghost resource identifier 231 and the ghost cursor 232. Alternative mechanisms for importing, or providing, a resource identifier to non-browser application programs or the desktop, such as by copying and pasting, or through direct user input entry, are equally applicable, and the dragging mechanism was shown in FIG. 2 strictly due to ease of illustrative presentation. For example, resource identifiers may be obtained from hyperlinks within the body of the displayed page, or from any page element with an attached hyperlink. In such an example, page elements comprising resource identifiers could, in the same manner as illustrated in FIG. 2, be dragged, or otherwise copied and pasted, into a non-browser program or the desktop 230. As another example, a resource identifier can be obtained from email messages, textual or multi-media documents, such as word processing documents, and the like. Ultimately, the source from which the resource identifiers are obtained is immaterial and orthogonal to the descriptions provided below. As such, the descriptions provided below are equally applicable to, and are intended to describe the handling of, any resource identifier, irrespective of its source.

The resource identifier 241 shown in the system 200 of FIG. 2 illustrates a URL, such as would commonly be utilized to identify web pages, or other resources, on the WWW. As indicated previously, although the description is presented with reference to specific examples, such as the URL 241 shown in FIG. 2, the descriptions are not intended to be so limited. As will be known by those skilled in the art, a URL can comprise identifying information 245 that can specify a specific server, or domain of servers, on the WWW and specific web pages or other resources on those severs, and can further comprise programmatic information 246 that can be presented to such servers for further processing. For example, the identifying information 245 can typically, in a URL, take the form of an enumeration of a specific server, or domain, and then subsequent enumerations of folders or directories of increasing specificity, and, ultimately, an enumeration of a specific web page or other resource, with each level being delineated by a forward slash character. Similarly, the programmatic information 246 can typically be placed after the identifying information 245, usually after an appropriate character, such as a forward slash, a question mark, an ampersand, or a hash character, and can comprise information that can be provided to computer-executable instructions executing on a remote computing device that is hosting the web page referenced by the identifying information 245.

The programmatic information 246 of a resource identifier 241 is typically formatted in a specific manner defined by the domain to which such programmatic information is to be presented. Thus, different domains can, and often do, utilize different formatting for the programmatic information 246, and deciphering the programmatic information can be performed differently depending on the domain identified by the identifying information 245. For example, if the identifying information 245 were to identify a web page, from a specific domain, that provides mapping services, the programmatic information 246 can comprise, in a predetermined order and format, an identification of the coordinates of the map to be displayed, the scale at which such a map is to be displayed, whether or not the map is to display topographic, or satellite information, and other like input that the mapping service provided by the identified web page can utilize to determine what kind of map is to be generated for the resource identifier 241. The exact manner in which the coordinates, scale, and mapping options, for example, are encoded and presented in the programmatic information 246, such as whether they are encoded in ASCII text, whether they are separated by commas, or semicolons, or other like characters, whether they are identified with specific variables, such as through the use of the equals sign, and what order each such element of information is presented in, can be in accordance with the formatting utilized by the domain and expected by whatever computer-executable instructions, or other services, are executing on the server computing device hosting the mapping web page identified by the resource identifier 241.

Traditionally, as will be known by those skilled in the art, the resource identifier 241 can represent a set of data, such as the HTML coding of a web page, or other such set of data appropriate for displaying the data page 151 in the browser window 240. In addition, however, server 260 may provide further services directed to providing data in a machine-readable form, that can be used by non-browser applications. For example, within the context of the ubiquitous WWW, a server hosting a web page can also provide eXtensible Markup Language (XML) data that can be utilized both by browser and non-browser application programs. In one embodiment, the parsing of the resource identifier comprises the retrieval of the identity of the such further resources, which, in turn, can identify yet other data from the content 160, or yet further services. Consequently, the descriptions below are also applicable to instances in which the resource identifier parser 137 can iteratively process succeeding levels of data and information to be able to present, or enable the obtaining of, data that was not present on the original data page, data that can be organized in a different manner than that of the original data page, or data that can be interacted with, such as by uploading, or otherwise providing, new data.

In one embodiment, the resource identifier parser 137 can comprise an understanding of the formatting of the programmatic information 246 associated with the resource identifier 241 of at least some well-known domains on the network 180. As such, the resource identifier parser 137 can parse the resource identifier 241, and extract information from the programmatic information 246 of the resource identifier 241, without having to communicate with a server identified by the resource identifier 241. The resource identifier parser 137 can, thereby, enable non-browser application programs and the operating system to utilize such extracted information and provide associated services and feedback when those non-browser application programs, or the operating system, receive, as input, a resource identifier 241.

Traditionally, providing a resource identifier to a non-browser application program would cause the non-browser application to treat the resource identifier as a textual string or, at most, as a link, or even to simply ignore the resource identifier altogether if the non-browser application was simply not capable of receiving such input. Similarly, providing a resource identifier to an operating system, such as by providing it to the desktop being presented by such operating system, would cause the operating system to create a link file representing the resource identifier, or potentially to invoke a browser application to handle the resource identifier.

However, since the resource identifier parser 137 can parse the resource identifier, such as the resource identifier 241, and extract therefrom information beyond merely the alphanumeric characters of the resource identifier, non-browser application programs and the operating system can provide greater functionality when resource identifiers are provided to them. For purposes of the below description, the term "derivative information" means any of the information that can be extracted from a resource identifier, including information that can be obtained from parsing the programmatic information 246 that can be part of the resource identifier 241, as well as any information that can be obtained from the resource identified by the resource identifier, such as data feeds or other like information. For example, if the non-browser application window 250, shown in the system 200 FIG. 2, were a spreadsheet provided by a spreadsheet application program, the dragging of the resource identifier 241 to the non-browser application window 250, as shown by the ghost resource identifier 251, would generally result in the placement of the alphanumeric characters of the resource identifier 241 into a cell of the spreadsheet. In the illustrated embodiment of the system 200 of FIG. 2, however, the programmatic information 246 of the resource identifier 241 can be parsed by the resource identifier parser 137, as indicated by the communication 270, and the resource identifier parser 137 can derive, from such programmatic information 246, derivative information that may be natively usable by the spreadsheet application generating the non-browser application window 250.

For example, if the resource identifier 241 was the resource identifier of a web page comprising an auction listing or a classified listing, the programmatic information 246 can comprise the title assigned to such a listing, which can typically be a short description of the item being sold or auctioned, as well as other information such as the end date and time of the auction, or the date and time when the classified listing was first listed. Derivative information, such as this title and date information, can be provided by the resource identifier parser 137 to the spreadsheet, as indicated by the communication 282, and can then be incorporated by the spreadsheet application program in a more meaningful way. For example, the title can be placed into one spreadsheet cell, while the listing date, or expiration time can be placed into another, associated spreadsheet cell. The provision of such derivative information, via the communication 282, by the resource identifier parser 137 to the spreadsheet application can be either in place of the provision of the textual information of the resource identifier 241 itself, or can be in addition to, such that the spreadsheet application can include not only the parsed information provided by the resource identifier parser 137, but could also include the resource identifier 241 itself.

In one embodiment, the derivative information obtained by the resource identifier parser 137 may not all be utilized by the non-browser application program, or the desktop 230. For example, if the resource identifier 241 was the resource identifier of a web page comprising a map, the programmatic information 246 can comprise, as indicated previously, coordinate information, scale information and display specifics, such as whether the displayed map comprises topographic features. The non-browser application that presents the non-browser application window 250 and receives the communication 282 may not, however, be able to utilize all such derivative information. For example, the non-browser application may be a weather application that can simply use the coordinate derivative information to obtain a zip code, or other such geographic identifier, and then present information in accordance with that zip code. Thus, the mere provision of derivative information by the resource identifier parser 137, such as via the communication 282, does not require that the receiving application utilize all, or even any, of such information. In one embodiment, a protocol can be established by which specific application programs can register, or otherwise indicate to the resource identifier parser 137, which types of derivative information such application programs can meaningfully process.

The derivative information obtained by the reference identifier parser 137 can, in one embodiment, be provided to non-browser application programs or the desktop 230 as a rich object that can expose properties and methods which can be accessed and utilized by the non-browser application programs or the desktop. For example, returning to the above examples of map-based data pages, the coordinate information can be exposed as a property, or a method can be exposed that, when invoked, can provide such coordinate information. Other examples, described further below, can comprise continuously updated derivative information, or more complex derivative information, such as that associated with network services that can be associated with the resource identifier. In such cases, the derivative information can be accessed through the calling of exposed methods and through the properties of the one or more objects, which can be exposed by the resource identifier parser 137 and can be changed in accordance with the derivative information obtained by the resource identifier parser.

As another example of obtaining derivative information from a resource identifier, if the resource identifier 241 were dragged onto the desktop area 230, as illustrated in FIG. 2 by the ghost resource identifier 231, the resource identifier parser 137 could, again, parse the resource identifier 241 and derive, such as from the programmatic information 246, derivative information that can be meaningfully utilized by the operating system hosting desktop area 230. For example, if the resource identifier 241 was the resource identifier of a web page showing a map, the programmatic information 246 can, as indicated previously, comprise the coordinates of the map, the scale of the map, and other like information. Such derivative information could be provided to the operating system, by the resource identifier parser 137, as illustrated by the communication 281, and could be utilized by the operating system to, for example, invoke a weather applet or widget that could display the current temperature and weather at the location of the coordinates extracted from the map resource identifier. Thus, in such an example, the provision of a resource identifier to the desktop area 230 could result in the placement of a weather widget providing meaningful information regarding the area identified by the resource identifier, rather than simply a hyperlink or other file that is nothing more than the resource identifier itself.

One advantage to the parsing of a resource identifier is that the resource identifier parser 137 need not rely on any processing, or provision of information, from a remote computing device, such as one whose resources may be identified by the resource identifier. Instead, the above described mechanisms can be performed based only on the information already present in the resource identifier, and the capability of the computer-executable instructions of the resource identifier parser 137 to meaningfully parse such information.

In another embodiment, however, the resource identifier itself may not comprise sufficient information, such as sufficient programmatic information, that can be meaningfully parsed and extracted by the resource identifier parser 137. In such an embodiment, the resource identifier parser 137 can communicate with one or more remote computing devices whose resources are identified by the resource identifier to determine if there is additional information associated with the resource identifier that can be provided to non-browser application programs, or the operating system, as the derivative information.

As shown in the system 200 of FIG. 2, a resource identifier, such as the resource identifier 241, can comprise identifying information 245 that can identify a data page, such as the data page 151, being hosted by a server computing device 260 to which the client computing device 210 is communicationally coupled via the network 180. The data page 151 can comprise a header 261, such as can be utilized to convey meaningful information regarding the data page 151 to a browser application, such as the browser application 138, shown in FIG. 1, and can further comprise content 262 that can provide the formatting and structure of the presentation of information or other resources from the content 160 within the context of the data page 151. The resource identifier parser 137 can, based on the identifying information 245 of the resource identifier 241, obtain derivative information from the data page 151, such as via communications between the client computing device 210 and the server computing device 260 that are directed over the network 180. Among the derivative information that the resource identifier parser 137 can obtain can be information from the header 261, as illustrated by the communication 290 shown in the system 200 FIG. 2. Information from the header 262, obtained by the resource identifier parser 137, as illustrated by the communication 290, can be provided by the resource identifier parser to the non-browser application or the operating system, as illustrated by the communications 282 and 281, respectively, instead of, or in addition to, the resource identifier 241.

Thus, for example, if the non-browser application program, that presents the non-browser application window 250, is a photo viewing program, the resource identifier parser 137 can obtain information from the data page header 261 that can specify a feed of photographs, such as can be provided by photo-oriented network services, and the photo viewing program can directly receive those photographs and display them in the non-browser application window 250. Returning to the specific embodiment of web pages, there exist, as will be known by those skilled in the art, photo sharing websites where users can subscribe to receive updates when any of their identified colleagues upload new photographs to the website. Information regarding the user, such as the user's name, and, potentially, even an encoded password, can be part of the programmatic information 246 that can be parsed from the resource identifier 241 by the resource identifier parser 137. Utilizing such information, the resource identifier parser 137 can log onto such a photo sharing website as the user identified by the programmatic information 246 of the resource identifier 241 and can obtain, such as from the header 261, information regarding this automated provision of colleagues' photographs. Such information, or even the photographs themselves, can then be provided by the resource identifier parser 137 to the photo viewing application and can be displayed within the non-browser application window 250. Thus, a photo viewing application that could not even understand a resource identifier, can now meaningfully display photographs that can be represented by the resource identifier 241 that can have been provided to the photo viewing application.

As another example, if the resource identifier 241 was provided to the desktop area 230, the header 261 could identify one or more feeds of data, such as those in accordance with known standards, such as the Really Simple Syndication (RSS) standard. The resource identifier parser 137 can obtain such derivative information from the header 261 based upon the identifying information 245 provided by the resource identifier 241. The resource identifier parser 137 can then provide such derivative information to the operating system which can, as an example, launch an RSS feed viewer applet, or widget, to display the data feeds within a small area of the desktop area 230 located close to where the user, for example, dragged and dropped the resource identifier 241, as illustrated by the ghost resource identifier 231 shown in the system 200 FIG. 2. In one embodiment, the operating system can consider the type or format of the derivative information being provided by the resource identifier parser 137 and can select a default application, applet, widget, or other set of computer-executable instructions that are associated with that type or format, and the operating system can then invoke those computer-executable instructions to handle that derivative information. As a result, while the provision of derivative information to non-browser application programs may be limited by the capability of the specific non-browser application program to which such information is provided, and to which the user indicated the resource identifier 241 should initially be provided, the provision of a resource identifier 241 to the desktop area 230 is not so limited since the operating system can select from any of a number of collections of computer executable-instructions to handle the derivative information being provided by the resource identifier parser 137.

Additionally, the parsing of a resource identifier can enable non-browser applications, or applications, widgets or applets invoked by the operating system, to perform data "mashups". Returning to the above examples of a data feed, if the operating system launched a data feed viewer applet, or widget, as a result of the user dragging the resource identifier 241 to the desktop area 230, as shown by the ghost resource identifier 231, then the provision of a second resource identifier that also identifies a data page whose header comprises a reference to another data feed, the resource identifier parser 137 can provide derivative information comprising that subsequent data feed to the same data feed viewer applet. The data feed viewer applet could then display, not only the data feed associated with the first resource identifier that the user provided to the desktop area 230, but can also display the data feed associated with the subsequent resource identifier. If the data feeds were provided in chronological order, such that the most recent data element received from the data feed was presented at the top, the data feed viewer could intermix the two data feeds such that their data elements were organized according to an aggregate chronological order. In such a manner a "mashup" of the data of the two data feeds could be accomplished.

In yet another embodiment, a server computing device, such as the server computing device 260, can provide a customized parser 237 to parse resource identifiers, such as the resource identifier 241, that identify resources available through the server computing device 260. The customized parser 237 can parse resource identifiers, such as the resource identifier 241 by extracting information from the programmatic information 246 of those resource identifiers, much in the same way as described above with reference to resource identifier parser 137. One difference, however, between the resource identifier parser 137 and the customized parser 237 can be that, because the customized parser 237 is provided by the domain generating the resource identifiers in the first place, the customized parser 237 may be more appropriate for the parsing of resource identifiers that the resource identifier parser 137 may not know how to parse correctly.

To obtain the customized parser 237, the resource identifier parser 137 can utilize the identifying information 245 of the resource identifier 241 to communicationally connect with the data page 151 identified by such identifying information 241. Such a communicational connection can enable the resource identifier parser 137 to learn from the data page 151, such as, for example, from the data page header 261, of the existence of the customized parser 237. In one embodiment, the customized parser 237 can be a downloadable collection of computer-executable instructions that the resource identifier 137 can download to the computing device 210. In such an embodiment, an association between the customized parser 237 and the domain of resource identifiers with which the customized parser 237 is to be utilized can be retained, such as in a registration database of the computing device 210, so that in the future, when the resource identifier parser 137 encounters a resource identifier of a relevant domain, the resource identifier parser 137 can invoke the customized parser 237 to parse such a resource identifier. Alternatively, the customized parser 237 can simply be stored on the computing device 210 and, in the future, when the resource identifier parser 137 encounters a resource identifier, it can merely poll the customized parsers stored on the computing device 210 to determine which, if any, of those customized parsers can parse the resource identifier encountered.

In an alternative embodiment, the customized parser 237, rather than being a downloadable set of computer-executable instructions that are designed to execute on a client computing device, such as the computing device 210, can, instead, be a network service to which a resource identifier can be provided, such as by the resource identifier parser 137, and, in return, parsed information from that resource identifier can be provided. The resource identifier parser 137 can then proceed to provide such a parsed information to non-browser application programs or the operating system, as described previously. In such an alternative embodiment, the data page header 261 can provide information to the resource identifier parser 137 of the existence and location of a network service providing such a customized parser 237, thereby enabling the resource identifier parser 137 to provide the resource identifier, such as the resource identifier 241, to such a service and receive therefrom the parsed information.

While the above mechanisms are applicable to the parsing of any type of resource identifiers, and the obtaining therefrom, in the manner described, of any type of derivative information, in one embodiment the resource identifiers can be resource identifiers of a data page, such as the data page 151, that can be directed to a particular person. For example, as will be known by those skilled in the art, social networking has become increasingly popular and, in such a context, a single data page, such as the data page 151, can cause the display on a browser window, such as the browser window 240, of a myriad of information regarding one particular user, such as, for example, the user's name, age, interests, photos of the user, messages from other users that have "befriended" the user through the social networking service offered by, for example, the server 260, the user's upcoming appointments, documents authored by the user, and other like information. The result can be that, colloquially, the data page 151, and its associated resource identifier 241, become identified with that particular person. They, in essence, come to represent that particular person, at least in a network context.

However, as will also be recognized by those skilled in the art, in such a social networking context, the data that can constitute a particular person, or, more specifically, the network representation of that person, can be dynamic, fluid, and context dependent. For example, the messages provided by that person's social networking friends can continuously change, as can the photos of that person, the documents they authored, and other like content and information. Consequently, in one embodiment, a resource identifier, such as the resource identifier 241, that can identify a data page, such as the data page 151, that can be a particular individual's page, such as in a social networking service provided by the server computing device 260, can be parsed and that particular individual's identifier, within the context of the social networking service, can be obtained. Such an identifier can then be utilized as a key with which to access or obtain other information, such as through services offered by the server computing device 260 hosting the data page 151. Such other services can provide access to the dynamic and fluid information that can comprise that specific person's network profile including, for example, providing access to the messages provided to such a person by that person's social networking friends, the photos uploaded by, for, or on behalf of, that person, the documents authored by that person, and other like dynamic information. In particular, the parsing of a resource identifier identifying a data page associated with a particular person within the context of a social network can provide access to information that does not even exist yet. For example, the parsing of such a resource identifier can provide access to services that will deliver, at a future time, information associated with that particular person that was created at that future time, such as messages from friends, or new photographs. Consequently, the resource identifier parser 137 can enable a resource identifier to become a universal representation of a particular person. As such, depending on the context, the desktop or non-browser applications can retrieve any relevant piece of data associated with the person, provided that the data is made available from the social networking service provided by the server computing device 260 and permitted by relevant access rules to be accessed using that person's identifier that can have been obtained from the resource identifier by the resource identifier parser 137.

Figure 3:
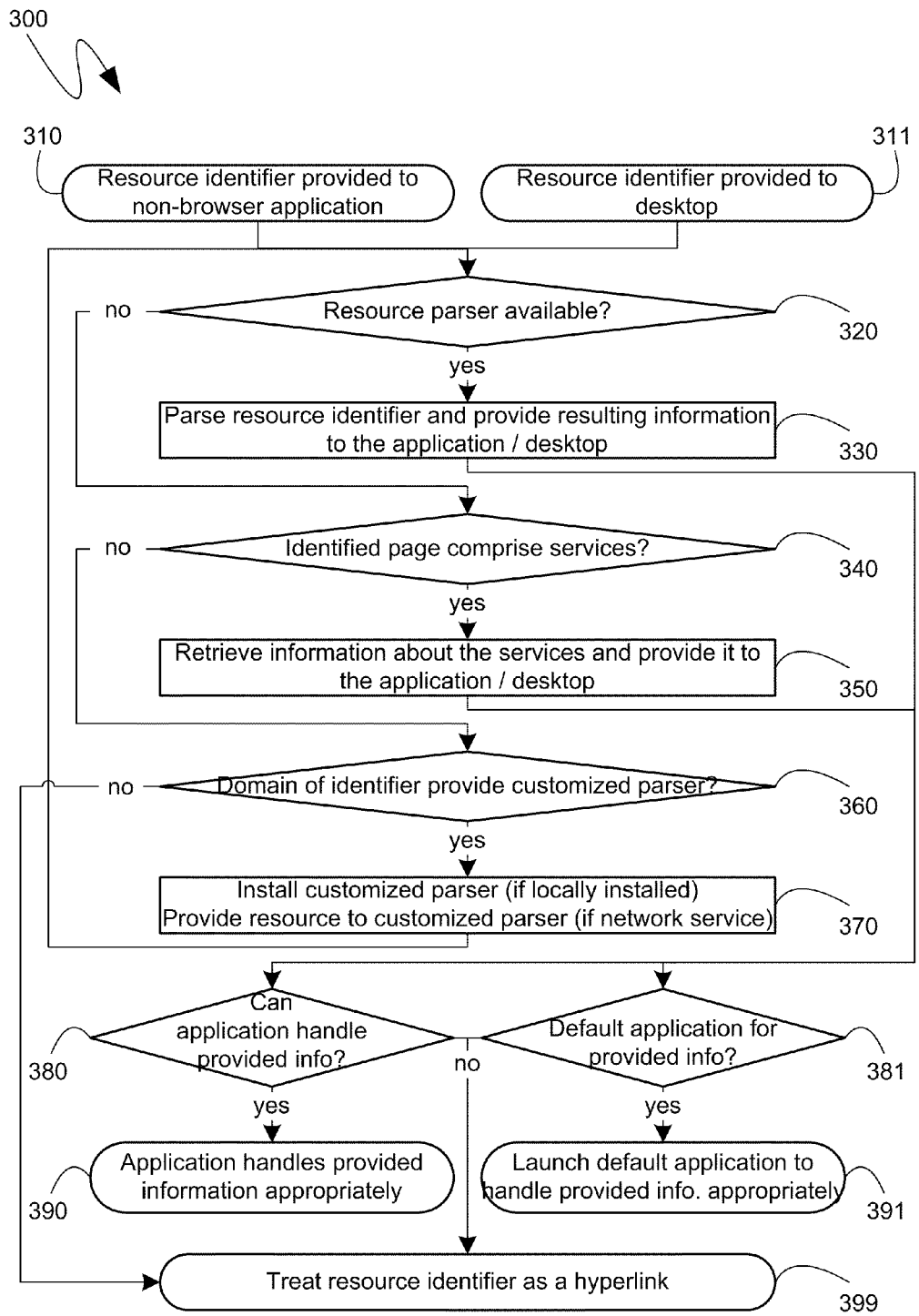
FIG. 3 is a flow diagram of an exemplary operation of a resource identifier parser.

Turning to FIG. 3, the flow diagram 300 shown therein illustrates an exemplary series of steps, such as can be performed by the resource identifier parser 137 shown in FIGS. 1 and 2. Processing can be initiated, as shown in the flow diagram 300 of FIG. 3, either when a resource identifier is provided to a non-browser application program, such as is shown in step 310, or, alternatively, when the resource identifier is provided to the desktop, such as is shown in step 311. As the steps of the flow diagram 300 are mostly applicable to either case, the flow diagram 300 has been illustrated such that, for the steps that do differ, steps illustrated on the left-hand side of the diagram correspond to the initiation performed at step 310, wherein the resource identifier was provided to a non-browser application program, while the steps illustrated on the right-hand side of the diagram correspond to the initiation performed at step 311, wherein the resource identifier was provided to the desktop. Steps that span both sides of the diagram are equally applicable irrespective of the manner in which processing was initiated. Thus, as shown, irrespective of whether the resource identifier was provided to the non-browser application at step 310, or to the desktop at step 311, processing can proceed with step 320, at which point determination can be made as to whether a parser is available for that type of resource identifier, or, more specifically, whether the capability to parse such a resource identifier has been provided for, either in the resource identifier parser 137, or through a customized parser 237, as shown in FIG. 2.

As indicated previously, for customized parsers, such as can be obtained at step 370, described in detail below, step 320 can comprise either a check of a registration database, wherein the customized parser can be associated with resource identifiers of a specific domain, or, alternatively, a polling of available customized parsers, in turn, to find one that can parse the resource identifier in question. If, at step 320, is determined that the parser is available for the resource identifier provided, processing can proceed with step 330, at which point the provided resource identifier can be parsed, and the resulting parsed information can be provided to either the non-browser application program, or the desktop, depending on whether processing was initiated by step 310, or step 311, respectively. If, however, at step 320, it is determined that a parser is not available for the resource identifier provided, processing can proceed to step 340, at which point an examination of the page identified by the resource identifier can be performed to determine if the identified page identifies, or otherwise comprises any services, such as a data feed or other like services. If, at step 340, it is determined that the page identified by the resource identifier does comprise services, processing can proceed with step 350 at which point information about the services can be retrieved and provided to the application, or desktop, in accordance with whichever was provided the resource identifier. Conversely, if, at step 340, is determined that the page identified by the resource identifier does not comprise any services, processing can proceed to step 360, at which point a determination can be made as to whether the domain of the page identified by the resource identifier offers any sort of customized resource identifier parsers.

If, at step 360, it is determined that the domain of the page identified by the resource identifier does provide a customized parser, processing can proceed with step 370, at which point such a customized parser can be downloaded and installed, if it is offered as a set of downloadable and locally-executable computer-executable instructions, or, alternatively, if the customized parser is provided as a network service, the resource identifier received in steps 310 or 311 can be provided to the network service at step 370. Processing can then return to step 320 and a determination, at step 320, can again be made as to whether a parser is available for the particular resource identifier provided. Since such a parser can have been installed, or located, as a result of step 370, the subsequent determination, at step 320, can result in a finding that an appropriate parser does exist and processing can proceed with step 330, as described above. If, however, is determined, at step 360, that the domain of the page identified by the resource identifier does not provide a customized parser, processing can proceed to step 399, at which point the resource identifier that was provided either step 310, or step 311, can be treated as a resource identifier in a traditional manner, such as by treating it as a hyperlink, a collection of alphanumeric characters, or the like.

Once derivative information from the provided resource identifier has been obtained, further processing can be performed, although not necessarily by the resource identifier parser 137 that was shown in FIG. 2, to determine whether the derivative information can be utilized by the non-browser application program, or the desktop, depending on which it received the resource identifier at steps 310 and 311, respectively. More specifically, as shown in the flow diagram 300 of FIG. 3, and maintaining the convention described above, if the resource identifier was provided to a non-browser application program at step 310, and derivative information was obtained from the provided resource identifier, processing can proceed with step 380, at which point a determination can be made as to whether the application to which the resource identifier was provided at step 310 can meaningfully accept the derivative information. If it is determined, at step 380, that such an application cannot meaningfully accept the derivative information, then the application can treat the resource identifier in a traditional manner, such as by treating it as a hyperlink, a collection of alphanumeric characters, or the like, at step 399. Alternatively, if, at step 380, it is determined the application can meaningfully accept the derivative information, then the application can proceed to do so at step 390. Similarly, if the resource identifier was provided to the desktop at step 311, and parsed information was obtained from the provided resource identifier, processing can proceed with step 381, at which point determination can be made as to whether an application, applet, widget, or other collection of computer-executable instructions, exists that can meaningfully accept the derivative information. If no such computer-executable instructions are determined to exist at step 381, processing can proceed with the operating system treating the resource identifier in a traditional manner at step 399. Conversely, if it is determined, at step 381, that at least one set of computer-executable instructions, however packaged, exists that can meaningfully accept the derivative information, then, at step 391, that set of computer-executable instructions can be instantiated and the derivative information can be provided to it.

As can be seen from the above descriptions, mechanisms have been provided for the parsing of resource identifiers to obtain therefrom derivative information that can be more meaningfully processed by non-browser application programs or the operating system. In view of the many possible variations of the subject matter described herein, we claim as our invention all such embodiments as may come within the scope of the following claims and equivalents thereto.

We claim:

1. One or more computer-readable memory comprising computer-executable instructions for parsing resource identifiers, the computer-executable instructions directed to steps comprising:
   intercepting, at a client computing device, a resource identifier being provided to a non-browser application program executing on the client computing device;
   identifying, at the client computing device, in response to the obtaining, a remote domain of a remote resource identified by the resource identifier;
   obtaining, from the remote resource, information regarding a customized parser associated with the remote domain;
   downloading the customized parser;
   executing, at the client computing device, the customized parser to parse the resource identifier to derive derivative information therefrom and
   presenting the derivative information to the non-browser application program instead of the resource identifier that was being provided to the non-browser application program.

2. The computer-readable memory of claim 1, comprising further computer-executable instructions directed to steps comprising:
   obtaining, from the remote resource, information regarding services associated with the remote resource;
   wherein the derivative information comprises the obtained information regarding the services associated with the remote resource.

3. The computer-readable memory of claim 2, wherein the remote resource represents a particular person, and wherein further the services associated with the remote resource comprise services providing dynamic information associated with the particular person.

4. The computer-readable memory of claim 1, wherein the computer-executable instructions directed to the utilizing the customized parser comprise computer-executable instructions for providing the resource identifier to a network service, the network service being the customized parser.

5. The computer-readable memory of claim 1, comprising further computer-executable instructions directed to steps comprising:
   treating the resource identifier as an alphanumeric string if the non-browser application program to which the derivative information is presented cannot handle the derivative information.

6. The computer-readable memory of claim 1, wherein the non-browser application program comprises a desktop presented by an operating system, comprising further computer-executable instructions directed to steps comprising:
   identifying a set of computer-executable instructions that can handle the derivative information;
   instantiating the identified set of computer-executable instructions; and
   presenting the derivative information to the identified set of computer-executable instructions.

7. A method of parsing resource identifiers, the method comprising the steps of:
   intercepting, at a client computing device, a resource identifier being provided to a non-browser application program executing on the client computing device;
   identifying, at the client computing device, in response to the obtaining, a remote domain of a remote resource identified by the resource identifier;
   obtaining, from the remote resource, information regarding a customized parser associated with the remote domain;
   downloading the customized parser;
   executing, at the client computing device, the customized parser to parse the resource identifier to derive derivative information therefrom; and
   presenting the derivative information to the non-browser application program instead of the resource identifier that was being provided to the non-browser application program.

8. The method of claim 7, further comprising the steps of:
   obtaining, from the remote resource, information regarding services associated with the remote resource;
   wherein the derivative information comprises the obtained information regarding the services associated with the remote resource.

9. The method of claim 8, wherein the remote resource represents a particular person, and wherein further the services associated with the resource comprise services providing dynamic information associated with the particular person.

10. The method of claim 7, wherein the step of utilizing the customized parser comprises the steps of:
    providing the resource identifier to a network service, the network service being the customized parser.

11. The method of claim 7, further comprising the steps of:
    treating the resource identifier as an alphanumeric string if the non-browser application program to which the derivative information is presented cannot handle the derivative information.

12. The method of claim 7, wherein the non-browser application program comprises a desktop presented by an operating system, the method further comprising the steps of:
    identifying a set of computer-executable instructions that can handle the derivative information;
    instantiating the identified set of computer-executable instructions; and
    presenting the derivative information to the identified set of computer-executable instructions.

13. A system for providing derivative information to a non-browser application program in place of a resource identifier from which the derivative information was derived, the system comprising:
    a client computing device remote from a domain, the client computing device comprising: the non-browser application program being provided a resource identifier; and a resource identifier parser for: obtaining, from a remote resource identified by the resource identifier, information regarding a customized parser associated with the domain; downloading the customized parser; parsing the resource identifier with the customized parser to derive derivative information therefrom and presenting the derivative information to the non-browser application program in place of the resource identifier that was being provided to the non-browser application program; and
    a computing device that is part of the domain of the resource identifier, the computing device that is part of the domain comprising the customized parser for utilization by the resource identifier parser.

14. The system of claim 13, wherein the resource identifier parser provides the resource identifier to the customized parser executing at the computing device that is part of the domain and receives therefrom the derivative information.

15. The system of claim 13, wherein the non-browser application program comprises a desktop presented by an operating system of the client computing device, and wherein further the client computing device comprising computer-executable instructions directed to identifying a set of computer-executable instructions that can handle the derivative information, instantiating the identified set of computer-executable instructions, and presenting the derivative information to the identified set of computer-executable instructions.

* * * * *